United States Patent
Bakkestuen et al.

(10) Patent No.: US 9,022,760 B2
(45) Date of Patent: May 5, 2015

(54) HIGH PRESSURE SEAL VENT

(75) Inventors: Robert S. Bakkestuen, Onalaska, WI (US); Jay H. Johnson, Houston, MN (US)

(73) Assignee: Trane International Inc., Piscataway, NJ (US)

( * ) Notice: Subject to any disclaimer, the term of this patent is extended or adjusted under 35 U.S.C. 154(b) by 334 days.

(21) Appl. No.: 13/287,673

(22) Filed: Nov. 2, 2011

(65) Prior Publication Data

US 2013/0108495 A1 May 2, 2013

(51) Int. Cl.
| | |
|---|---|
| *F01C 19/00* | (2006.01) |
| *F03C 2/00* | (2006.01) |
| *F03C 4/00* | (2006.01) |
| *F04C 2/00* | (2006.01) |
| *F04C 15/00* | (2006.01) |
| *F04C 27/00* | (2006.01) |
| *F01C 21/04* | (2006.01) |
| *F01C 21/06* | (2006.01) |
| *F04C 27/02* | (2006.01) |
| *F04C 29/04* | (2006.01) |
| *F04C 18/16* | (2006.01) |
| *G01F 1/34* | (2006.01) |
| *F04C 29/00* | (2006.01) |
| *F04C 23/00* | (2006.01) |

(52) U.S. Cl.
CPC . *F04C 18/16* (2013.01); *G01F 1/34* (2013.01); *F04C 23/008* (2013.01); *F04C 27/009* (2013.01); *F04C 29/0028* (2013.01)

(58) Field of Classification Search
USPC .............. 418/79, 84, 88, 98, 104, 194, 201.1, 418/202, 205; 417/423.13; 62/323.4, 402
See application file for complete search history.

(56) References Cited

U.S. PATENT DOCUMENTS

| | | | |
|---|---|---|---|
| 3,178,104 A | 4/1965 | Williams et al. | |
| 3,257,957 A | 6/1966 | Tracy | |
| 3,462,072 A * | 8/1969 | Schibbye | 418/98 |
| 3,902,827 A | 9/1975 | Schibbye | |

(Continued)

FOREIGN PATENT DOCUMENTS

| | | |
|---|---|---|
| WO | 91/17345 | 11/1991 |
| WO | 92/19869 | 11/1992 |

(Continued)

OTHER PUBLICATIONS

PCT/US2012/062930 International Search Report and Written Opinion dated Mar. 8, 2013 (9 pages).

*Primary Examiner* — Thai Ba Trieu
*Assistant Examiner* — Dapinder Singh
(74) *Attorney, Agent, or Firm* — Hamre, Schumann, Mueller & Larson, P.C.

(57) ABSTRACT

A compressor for compressing refrigerant in a refrigerant circuit includes a housing defining a compression chamber. A screw rotor is mounted within the housing and configured to form a pocket of high pressure refrigerant and a pocket of low pressure refrigerant within the compression chamber. The screw rotor has a rotor shaft rotating about an axis. A bearing cavity includes at least one bearing rotatably supporting the rotor shaft. A partition through which the rotor shaft extends separates the bearing cavity from the compression chamber. A contacting seal is sealingly engaged with the rotor shaft and disposed in the bearing cavity proximate the partition. A passage has an opening adjacent the rotor shaft between the contacting seal and the compression chamber and in fluid communication with the pocket of low pressure refrigerant.

20 Claims, 6 Drawing Sheets

(56) References Cited

U.S. PATENT DOCUMENTS

| | | | |
|---|---|---|---|
| 3,975,123 A | 8/1976 | Schibbye | |
| 4,193,603 A | 3/1980 | Sood | |
| 4,328,684 A * | 5/1982 | Leo | 62/402 |
| 4,329,126 A | 5/1982 | Nishimura | |
| 4,781,553 A | 11/1988 | Nomura et al. | |
| 4,813,857 A | 3/1989 | Kawakami | |
| 4,952,125 A | 8/1990 | Nagai | |
| 5,037,282 A | 8/1991 | Englund | |
| 5,104,284 A | 4/1992 | Hustak, Jr. et al. | |
| 5,167,496 A * | 12/1992 | Jacobsson et al. | 418/102 |
| 5,348,456 A | 9/1994 | Kun et al. | |
| 5,641,280 A | 6/1997 | Timuska | |
| 6,093,008 A * | 7/2000 | Kirsten | 418/201.1 |
| 6,287,100 B1 | 9/2001 | Achtelik et al. | |
| 6,612,820 B1 | 9/2003 | Staat et al. | |
| 2004/0219045 A1* | 11/2004 | Yoshimura et al. | 418/3 |
| 2005/0084404 A1* | 4/2005 | Okada et al. | 418/104 |
| 2009/0098003 A1* | 4/2009 | Kothnur et al. | 418/205 |

FOREIGN PATENT DOCUMENTS

| | | |
|---|---|---|
| WO | 94/15100 | 7/1994 |
| WO | 94/27050 | 11/1994 |

* cited by examiner

HIGH PRESSURE SEAL VENT

BACKGROUND

The present invention relates to a system and method of venting refrigerant from a high pressure region adjacent a contacting shaft seal to a lower pressure region to reduce the pressure differential across the seal.

Screw compressors are positive displacement machines that work on the principle of volume reduction to increase refrigerant pressure. Two intermeshing helical screws within a compression chamber interact to convert low pressure refrigerant at the inlet to high pressure refrigerant at the discharge. The helical screws rotate about rotor shafts that are supported by bearings located within a bearing housing. Due to the pressure difference between the high pressure end of the compression chamber and the bearing housing, refrigerant can leak from the compression chamber through the path created by penetration of each rotor shaft into the bearing housing. Shaft seals are typically utilized to minimize this leakage.

SUMMARY

When contacting shaft seals are used to impede leakage of high pressure refrigerant along a rotor shaft, the differential pressure across the contacting shaft seal increases seal wear and drag forces that require additional power from the compressor.

In one embodiment of a compressor for compressing refrigerant in a refrigerant circuit, the compressor includes a housing defining a compression chamber. A screw rotor is mounted within the housing and configured to form a pocket of high pressure refrigerant and a pocket of low pressure refrigerant within the compression chamber. The screw rotor has a rotor shaft rotating about an axis. A bearing cavity includes at least one bearing rotatably supporting the rotor shaft. A partition through which the rotor shaft extends separates the bearing cavity from the compression chamber. A contacting seal is sealingly engaged with the rotor shaft and disposed in the bearing cavity proximate the partition. A passage has an opening adjacent the rotor shaft between the contacting seal and the compression chamber and in fluid communication with the pocket of low pressure refrigerant.

In another embodiment of a compressor for compressing refrigerant in a refrigerant circuit, the compressor includes a housing defining a compression chamber. A pair of intermeshing screw rotors is mounted within the housing and configured to form a plurality of pockets. Each pocket has a range of operable refrigerant pressure less than a compressor discharge pressure at a compressor discharge. One of the pair of intermeshing screw rotors has a rotor shaft rotating about an axis. A bearing cavity includes at least one bearing rotatably supporting the rotor shaft. A partition through which the rotor shaft extends separates the bearing cavity from the compression chamber wherein a refrigerant leakage path is formed fluidly connecting the compression chamber to the bearing cavity. A contacting seal is sealingly engaged with the rotor shaft and disposed in the bearing cavity adjacent the leakage path. A passage has an opening adjacent the rotor shaft between the contacting seal and the leakage path and in fluid communication with at least one of the plurality of pockets.

In one embodiment of a method of reducing the wear rate of a shaft seal, the shaft seal is sealingly engaged with a rotor shaft of a screw rotor that rotates about an axis and that is mounted within a compression chamber of a rotor housing. The shaft seal is disposed in a bearing cavity directly proximate a partition separating the bearing cavity from the compression chamber and through which the rotor shaft extends. The method includes operating the screw rotor to produce a pocket of high pressure refrigerant and a pocket of low pressure refrigerant within the compression chamber. The method further includes passing a volume of high pressure refrigerant from an area adjacent the rotor shaft between the shaft seal and the compression chamber to the pocket of low pressure refrigerant.

In one embodiment of a method of determining the optimum position of a vent to maximize the adiabatic efficiency of a compressor, the shaft seal is sealingly engaged with a rotor shaft of a screw rotor that is mounted within a compression chamber. The shaft seal is disposed in a bearing cavity directly proximate a partition separating the bearing cavity from the compression chamber and through which the rotor shaft extends. The method includes locating an opening of a first vent adjacent the rotor shaft between the shaft seal and the compression chamber. The method further includes locating a discharge of the first vent in fluid communication with a first operable pocket of low pressure refrigerant. The method further includes operating the screw rotor to create a pocket of high pressure refrigerant and the first pocket of low pressure refrigerant. The method further includes measuring the power consumed and overall refrigerant flow rate produced by the compressor during operation. The method further includes locating an opening of a second vent adjacent the rotor shaft between the shaft seal and the compression chamber. The method further includes locating a discharge of the second vent in fluid communication with a second operable pocket of low pressure refrigerant. The method further includes operating the screw rotor to create a pocket of high pressure refrigerant and the second pocket of low pressure refrigerant. The method further includes measuring the power consumed and overall refrigerant flow rate produced by the compressor during operation.

In one embodiment of a method of determining the optimum internal dimensions of a vent to maximize the adiabatic efficiency of a compressor, the shaft seal is sealingly engaged with a rotor shaft of a screw rotor that is mounted within a compression chamber. The shaft seal is disposed in a bearing cavity directly proximate a partition separating the bearing cavity from the compression chamber and through which the rotor shaft extends. The method includes locating a first-sized vent between 1) a region adjacent the rotor shaft between the shaft seal and the compression chamber and 2) an operable pocket of low pressure refrigerant. The method further includes operating the screw rotor to create a pocket of high pressure refrigerant and the pocket of low pressure refrigerant. The method further includes measuring the power consumed and overall refrigerant flow rate produced by the compressor during operation. The method further includes locating a second-sized vent between the region and the operable pocket of low pressure refrigerant. The method further includes operating the screw rotor to create a pocket of high pressure refrigerant and the pocket of low pressure refrigerant. The method further includes measuring the power consumed and overall refrigerant flow rate produced by the compressor during operation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
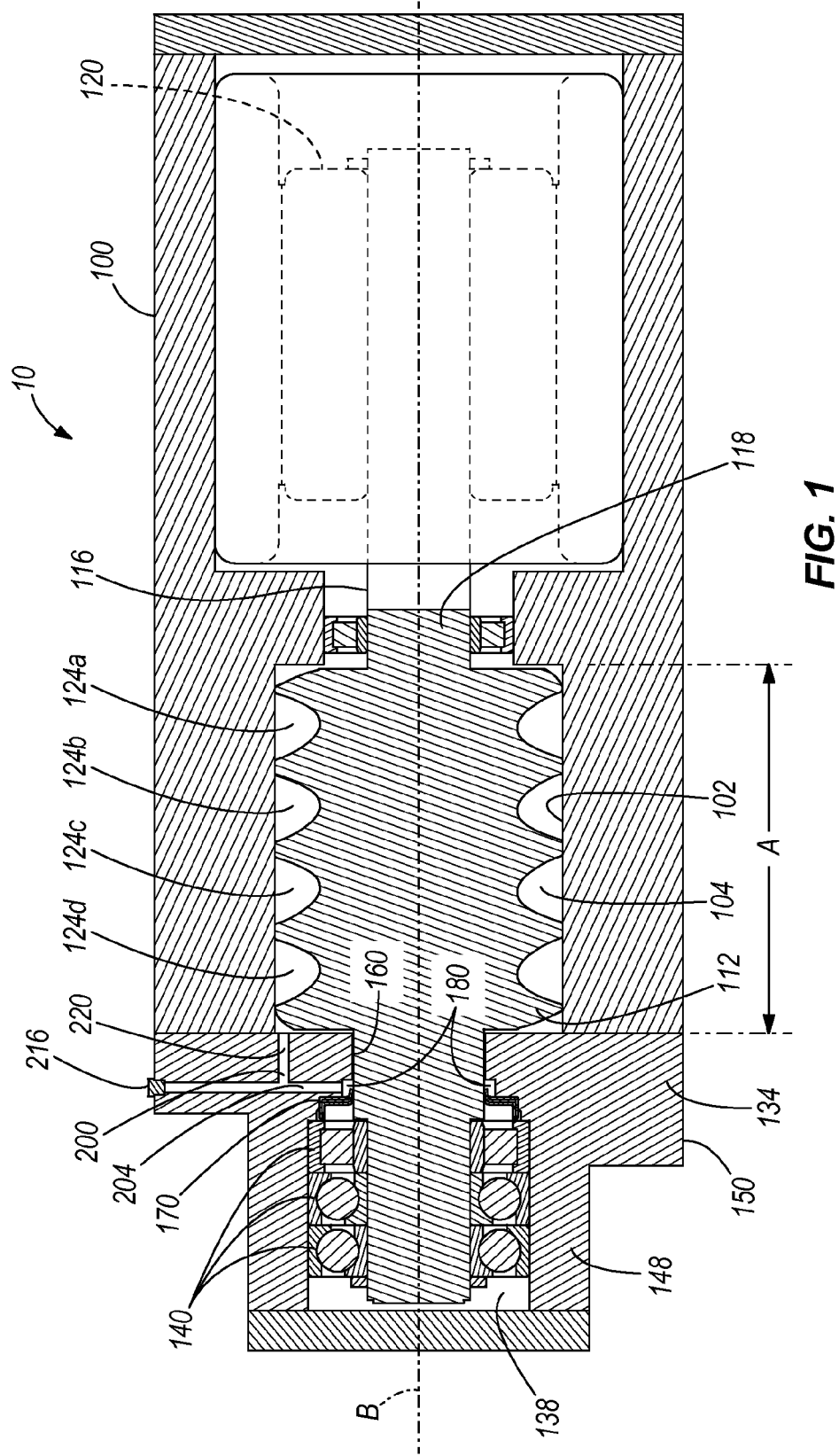
FIG. 1 is a cross sectional view of a screw compressor with an internal vent adjacent a contacting shaft seal.

FIG. 1 illustrates a screw compressor 10 for compressing refrigerant in a refrigerant circuit. A rotor housing 100 includes an interior surface 102 that defines a compression chamber 104 with an axial length "A." Referring also to FIG. 6, the compression chamber 104 contains a pair of intermeshing screws in the form of a male helical screw 108 and a female helical screw 112. The male screw 108 is fixed about a rotor shaft 116, coupled to an electric motor 120 (shown in phantom "behind" the cross sectional plane of FIG. 1), and includes a plurality of interlobe spaces 121. The female screw 112 is fixed about a rotor shaft 118 rotating about axis "B," is driven by the male screw 108, and includes a plurality of flute spaces 123. For purposes of the following description, reference will primarily be made to the rotor shaft 118 and the female helical screw 112, though it is to be understood that the scope of the invention is equally applicable to the rotor shaft 116 and the male helical screw 108, i.e., with respect to the interlobe spaces 121 of the male helical screw 108.

Figure 6:
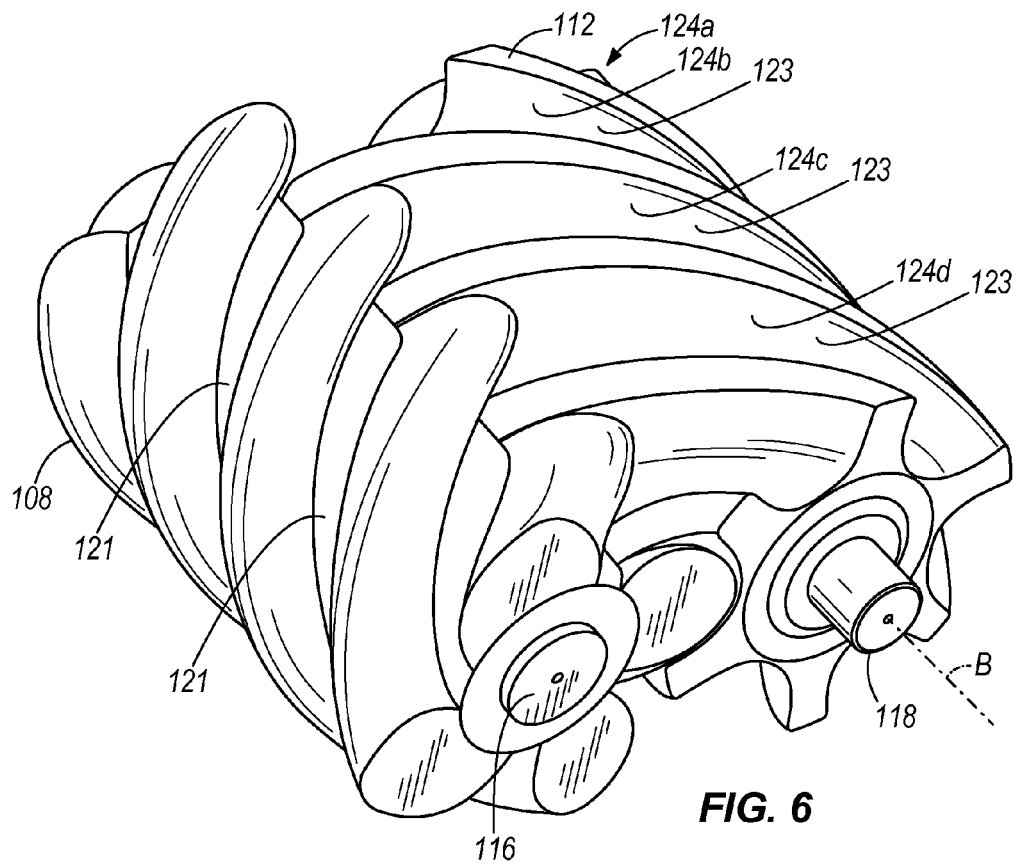
FIG. 6 is a perspective view of the helical screws of the screw compressors of FIGS. 1-5.
Figure 7:
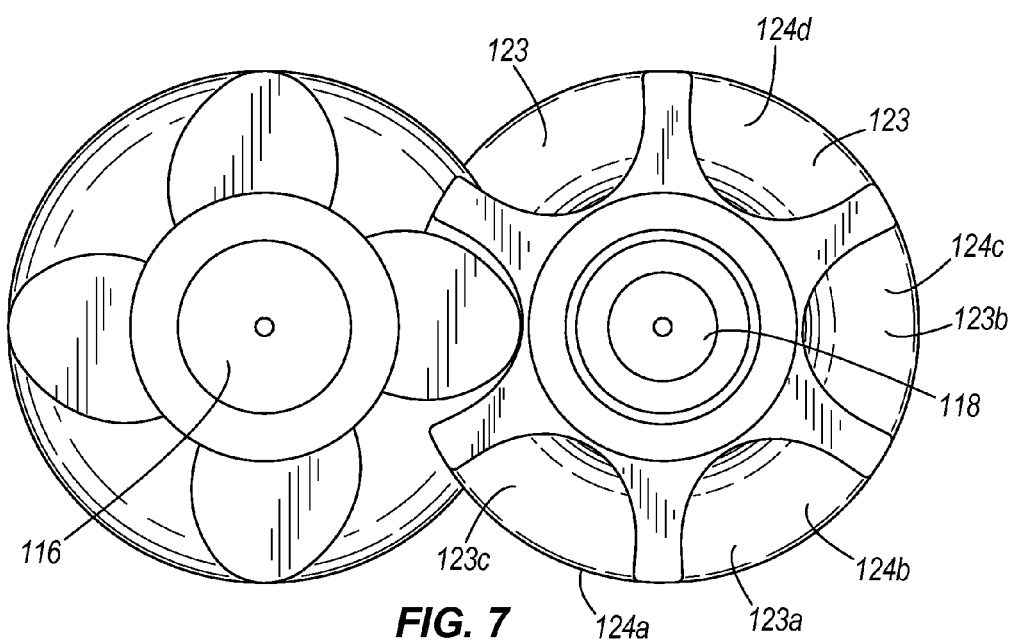
FIG. 7 is a front view of the helical screws of FIG. 6.

Referring to FIGS. 1, 6, and 7, pockets 124 (as illustrated, 124a, 124b, 124c, 124d), are formed from the suction inlet (not shown) to the discharge outlet (not shown) within the flute spaces 123 of the female screw 112 by the interacting geometry of the screws 108, 112. Any pocket 124 as defined is only temporally coextensive with a physical flute space 123 of the screw 112, i.e., the specific pocket 124 does not rotate 360° with the screw 112. For example, referring to FIG. 7, in one-sixth of a cycle the physical flute space 123a (associated with the pocket identified as 124b in the illustration) will itself rotate to the position currently occupied by flute space 123b as the flute space 123c rotates to the position currently occupied by flute space 123a. But pocket 124b will remain in the position as shown and represents an operationally consistent refrigerant pressure range, constrained to a pressure change of less than approximately one-sixth of the total pressure change in one cycle. Each pocket 124 therefore represents a space having a limited range of refrigerant pressure and volume for a given compression cycle. Thus, during the compression cycle a plurality of pockets 124 are formed of varying pressure such that the refrigerant pressure in pocket 124a is less than that in pocket 124b, which is less than that in pocket 124c, and so on, as will be understood by one of skill in the art. Therefore, the pocket 124d would be considered a pocket of relatively high pressure while the pocket 124a would be considered a pocket of relatively low pressure. As will also be familiar to those of skill in the art, fewer or more flute spaces 123 (and pockets 124) than illustrated may exist between the screws 108, 112.

Figure 2:
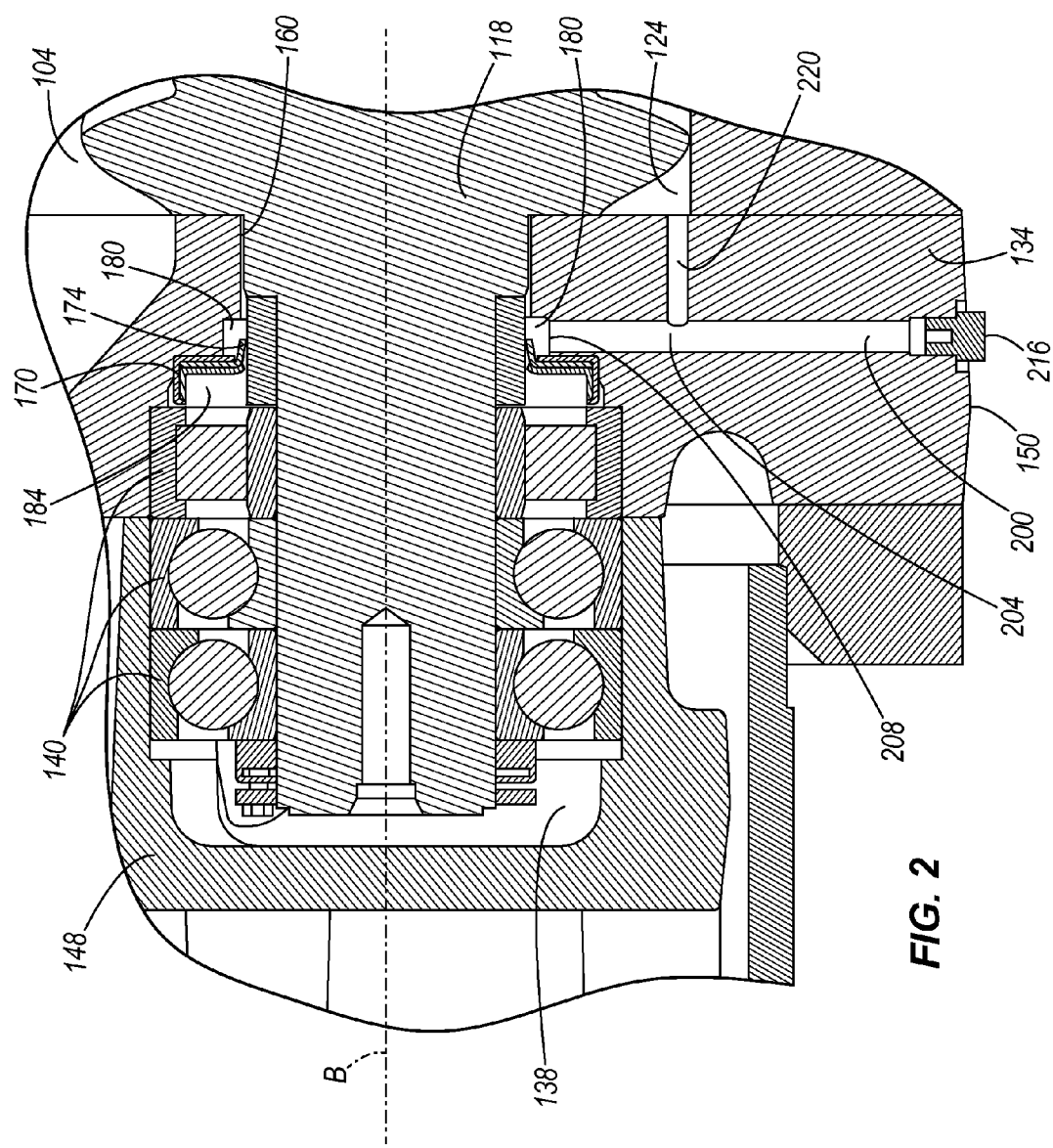
FIG. 2 is a partial cross sectional view of a bearing region of a screw compressor with the internal vent of FIG. 1 arranged on an opposing side of the bearing housing.

Referring to FIGS. 1 and 2, the rotor shaft 118 penetrates and extends through a partition 134 between the compression chamber 104 and a bearing cavity 138. A plurality of bearings 140 are positioned within the bearing cavity 138, which is defined by a bearing housing 148 having an exterior surface 150. The bearings 140 may include a combination of various thrust and axial-loading bearings designed to withstand the unbalanced axial thrust and radial loads inherent in screw compressor operation. The partition 134 may be a portion of the bearing housing 148 or a portion of the rotor housing 100, depending on the configuration of the particular compressor 10. This penetration creates a leakage path 160 from the compression chamber 104 to the bearing cavity 138. Each pocket 124, by virtue of helical screw geometry, is in fluid communication with the leakage path 160.

A shaft seal 170 is disposed between the bearings 140 and the leakage path 160 immediately adjacent the leakage path 160 directly proximate the partition 134. While various types of shaft seal can be utilized for this purpose, such as, for example, non-contacting labyrinth seals, a pressure actuated, contacting lip seal 170 is illustrated in the figures and includes a sealing face 174 in direct contact with the rotor shaft 118. As shown more clearly in FIG. 2, a high seal side pressure region 180 is operationally formed in fluid communication with the leakage path 160. A low seal side pressure region 184 is operationally formed in fluid communication with the bearing cavity 138.

Referring again to FIGS. 1 and 2, a passage, or vent 200, in fluid communication with the high seal side pressure region 180 includes a radial portion 204 having an opening 208. The opening 208 is located adjacent the rotor shaft 118 at the high seal side pressure region 180 between the seal 170 and the compression chamber 104, and more particularly between the seal 170 and the leakage path 160. Specifically, the opening 208 is in immediate fluid contact with the leakage path 160, with no intervening shaft seals or components disposed therebetween. The radial portion 204 extends to the outer surface 150 of the bearing housing 148 and ends in a plug 216, which seals the vent 200 from external conditions and prevents refrigerant contact with the atmosphere. An axial portion 220 of the vent 200 extends through the partition 134 and discharges in a direction substantially parallel to the axial direction "B" into a predetermined pocket 124. The axial portion 220 can be in communication with any of pockets 124a-124d (see FIGS. 6 and 7).

Thus, the vent 200 can be located at any circumferential position around the penetrating rotor shaft 118 to access any of the pockets 124, as illustrated in FIGS. 6 and 7. For example, the axial portion 220 of FIG. 2 at the bottom of the bearing housing 148 is in communication with pocket 124b while the vent 200 of FIG. 1 is positioned in communication with pocket 124d.

Figure 3:
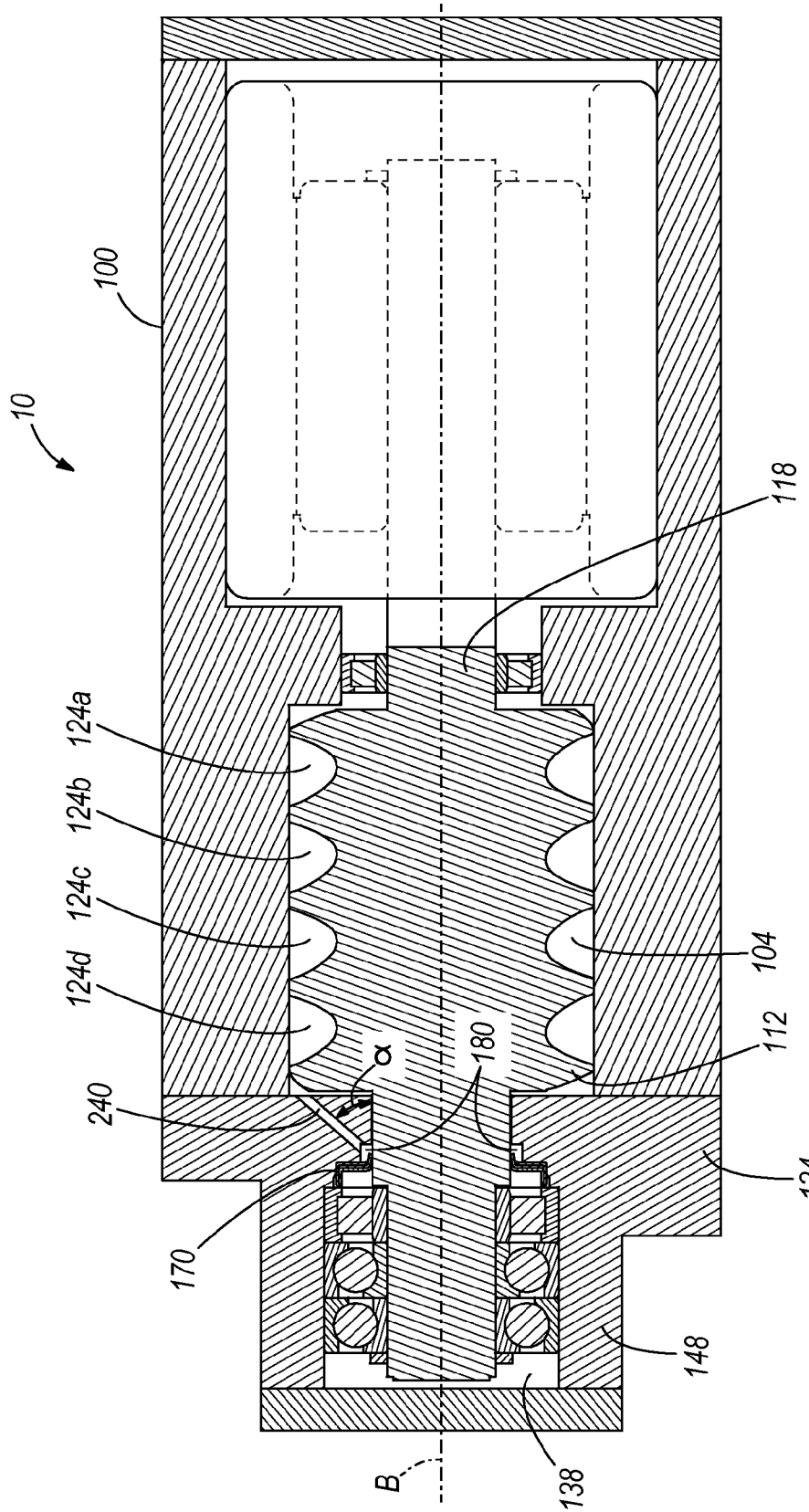
FIG. 3 is a cross sectional view of a screw compressor with an alternative internal vent adjacent a contacting shaft seal.

FIG. 3 presents an alternative internal configuration to the vent of FIGS. 1 and 2. As shown, the vent 240 is angled directly from the high pressure region 180 to a predetermined pocket 124 (e.g., 124a, 124b, 124c, 124d) as previously identified. In the illustrated embodiment, the angle α is approximately 49° from the axial direction "B," but is dependent on the screw compressor geometry and can range from about 10° to about 70°. As previously explained, the vent 200 can be placed at any circumferential position around the rotor shaft 118 to link the high side pressure region 180 to the desired pocket 124a, 124b, 124c, or 124d.

Figure 4:
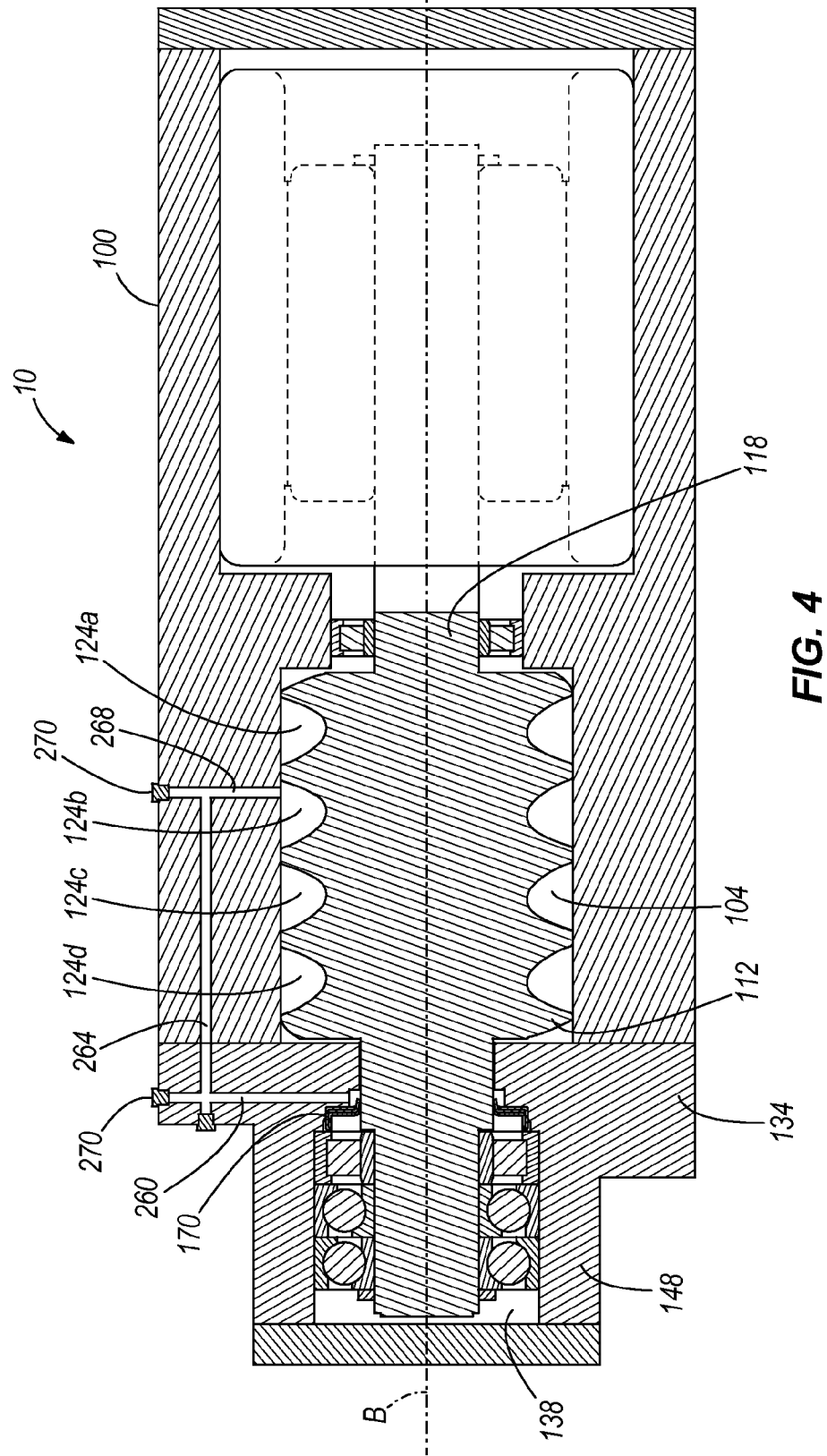
FIG. 4 is a cross sectional view of a screw compressor with an alternative internal vent adjacent a contacting shaft seal.

Referring to FIGS. 4 and 6, a vent 260 somewhat similar to the embodiment of FIG. 1 is illustrated with an axial portion 264 that passes not directly through the partition 134 into the chamber 104, but through a portion of the rotor housing 100. A discharge leg 268 extends into the compression chamber 104 between the suction inlet and the discharge outlet at a predetermined pocket 124, for example, pocket 124b. Plugs 270 seal the vent 260 as previously described. The vent 260 can be circumferentially positioned as desired to fluidly communicate with any of the illustrated pockets, 124a, 124b, etc.

Figure 5:
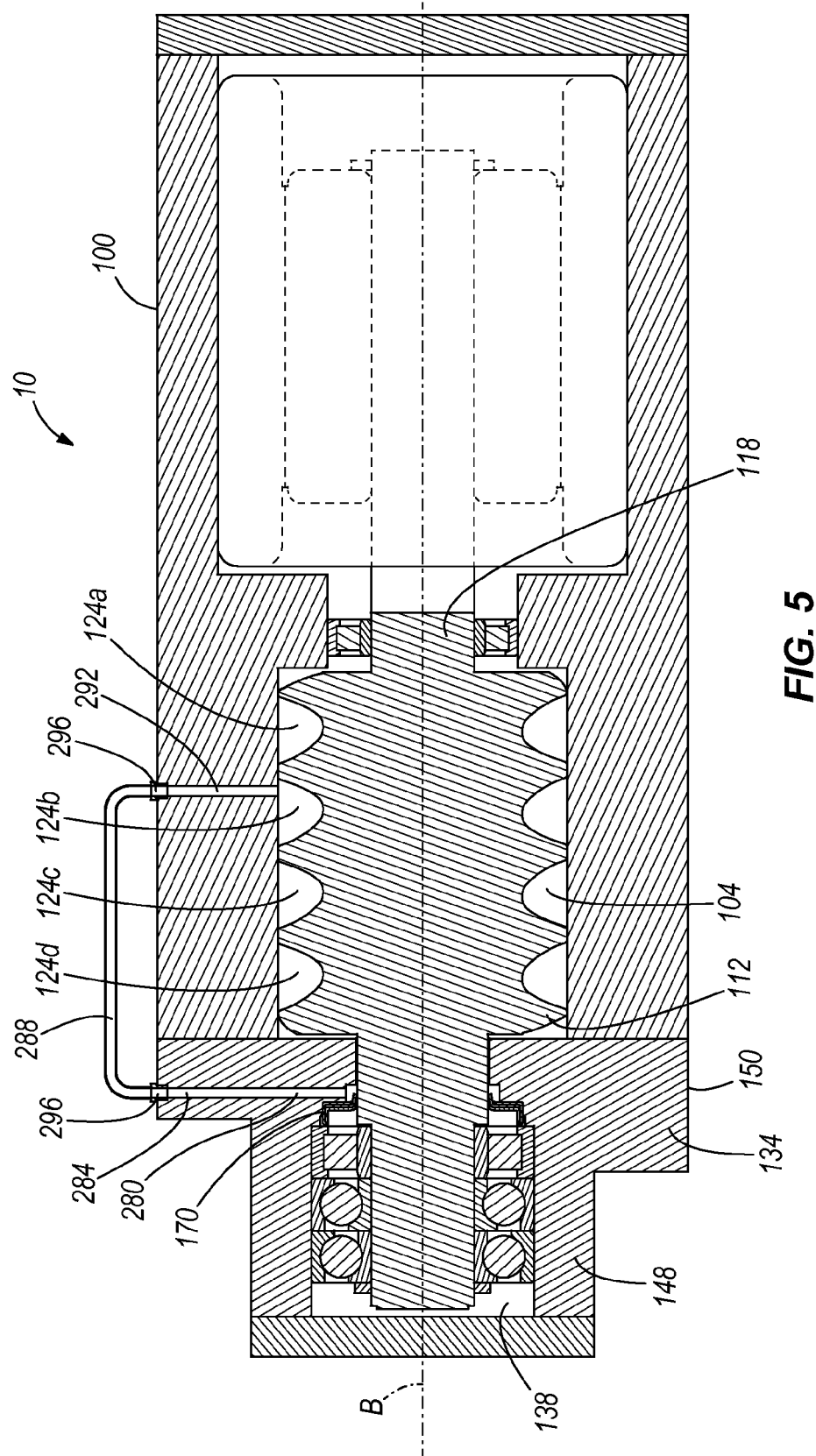
FIG. 5 is a cross sectional view of a screw compressor with an external vent adjacent a contacting shaft seal.

Referring to FIGS. 5 and 6, a vent 280 includes a radial portion 284 extending to the exterior surface 150 of the bearing housing 148. An exterior portion 288 external to the rotor housing 100 spans axially across a portion of the housing 100. A discharge leg 292 extends back into the rotor housing 100 and into the compression chamber 104 between the suction inlet and the discharge outlet at a predetermined pocket 124, for example, pocket 124b. Removable connectors 296 couple the exterior portion 288 to the respective radial portion 284 and discharge leg 292. The vent 280 can extend radially to any circumferential point on the exterior surface 150 in order to communicate with a preferred pocket 124.

The vents 200, 240, 260, 280 are formed by drilling or otherwise machining out a plurality of holes within the portion of the bearing housing 148 or portion of the rotor housing 100.

Under design operating conditions, the electric motor 120 drives the rotor shaft 116 and thus the male screw 108, which in turn drives the female screw 112. The bearings 140 functionally support the weight of and operational forces produced by the rotating screw 112. Pressure within the bearing cavity 138 may optionally be vented (not shown) to the compressor suction inlet or a pocket 124 with a pressure close to that of the suction inlet to reduce the adverse effects of high pressure levels on the bearings.

Refrigerant enters the suction inlet and is compressed via the reduction in volume of the flute spaces 123 during helical screw rotation. From a relatively low suction pressure when the flute spaces 123 are at maximum volume, the pressure increases in each flute space as the volume decreases until the refrigerant is discharged at a high pressure at the discharge outlet, as is commonly known to those of skill in the art. This action forms a pressure gradient along the axial length "A" of the screw 112 (see FIG. 1) increasing from the suction inlet to the discharge outlet. In FIGS. 1, 6, and 7, for example, the operational pressure within pocket 124b is greater than the pressure within pocket 124a.

Higher pressure refrigerant from or near the discharge outlet flows through the aforementioned leakage path 160 into the high seal side pressure region 180. The pressure in the region 180 is determined by the net leakage of high pressure refrigerant from the compressor discharge outlet in combination with the remaining pockets 124.

The contacting lip seal 170, aided by a thin film of oil, hinders passage of high pressure refrigerant from the high seal side pressure region 180 to the low seal side pressure region 184. The contacting friction between the rotating shaft 118 and the stationary contact seal 170 during normal compression cycles creates a drag force counter to the shaft rotational direction. This drag force acts on the seal 170 and leads to accelerated seal wear. Due to the configuration of the contact seal 170, the drag force and wear rate increase with an increase in differential pressure across the seal 170, i.e., the difference in pressure between the high seal side pressure region 180 and the low seal side pressure region 184. The vents 200, 240, 260, 280 pass the high pressure refrigerant within the region 180 to a lower pressure pocket 124, lessening this differential pressure. Concurrently with the drop in differential pressure, the recirculated refrigerant gas flow in vents 200, 240, 260, 280 increases for a given discharge flow of refrigerant.

The presence of the drag force must be overcome by additional compressor power and lessening this drag force leads to a decrease in compressor power consumption. At the same time, a higher recirculated refrigerant gas flow requires more power from the compressor. The operation of any of the vents 200, 240, 260, 280 therefore simultaneously reduces seal drag while increasing recirculated refrigerant gas flow. More particularly, a vent 200, 240, 260, 280 discharging to a pocket 124 of lower pressure, e.g., pocket 124a, will result in lower power consumption to overcome seal drag force and higher power consumption to recompress the recirculated refrigerant gas, than a vent 200, 240, 260, 280 discharging to a pocket of higher pressure, e.g., pocket 124d. It has been determined that the proper sizing and discharge placement of the seal vents 200, 240, 260, 280 results in an overall increase in total compressor adiabatic efficiency. In other words, through use of the vents 200, 240, 260, 280, the compressor power regained through reduction of seal drag forces is, with the proper vent configuration, greater than that required to recompress the additional recirculated refrigerant gas flow. Operational or laboratory testing is done to determine the most effective configuration of the vents 200, 240, 260, 280.

The sizing of a vent 200 can be evaluated for this purpose. Referring to the embodiment of FIG. 2 as exemplary with respect to a particular compressor 10, a first sized vent 200, by which is meant a vent 200 having specific internal dimensions, such as a first diameter, is located between the high seal side pressure region 180 and a predetermined operable pocket of low pressure refrigerant, such as pocket 124a. The screw compressor 10 is operated as previously described and power consumption and overall refrigerant flow rate are measured and monitored. A second sized vent 200 with a specific internal dimension, such as a second diameter, is substituted for the first sized vent 200, and located along the same path between the region 180 and the pocket 124a. The compressor 10 is operated and power consumption and overall refrigerant flow rate are measured and monitored. Alternative sizes of vents 200 are similarly substituted, tested, and the results monitored.

The desired pocket location, i.e., to which pocket 124 the vent discharges, can also be evaluated. Again referring to the embodiment of FIG. 2 for a particular compressor 10, an opening 208 of a first vent 200 is located adjacent the rotor shaft 118 at the high seal side pressure region 180 between the seal 170 and the compression chamber 104. The first vent 200 is discharged in fluid communication with a first operable pocket of low pressure refrigerant, such as pocket 124a. The screw compressor 10 is operated as previously described and power consumption and overall refrigerant flow rate are measured and monitored. A second vent 200 is then substituted for the first vent 200, with an opening of the second vent 200 identically located adjacent the rotor shaft 118 between the seal 170 and the compression chamber 104. The second vent 200 is discharged in fluid communication with a second operable pocket of low pressure refrigerant, such as pocket 124b. The compressor 10 is operated and power consumption and overall refrigerant flow rate are measured and monitored. Additional vents 200 discharging to other pockets 124 can be similarly evaluated.

The results of this testing, or additional combination testing with the two parameters (vent size and discharge location) are undertaken in an effort to determine the optimum configuration that requires the least amount of compressor power during operation for a specific compressor. In the configuration of FIG. 2, for example, the vent 200 can have a diameter ranging from about 0.05 inches to about 0.75 inches.

Various features and advantages of the invention are set forth in the following claims.

What is claimed is:

1. A compressor for compressing refrigerant in a refrigerant circuit, the compressor comprising:
    a housing defining a compression chamber;
    a screw rotor mounted within the housing and configured to form a pocket of high pressure refrigerant and a pocket of low pressure refrigerant within the compression chamber, the screw rotor having a rotor shaft rotating about an axis;
    a bearing cavity including at least one bearing rotatably supporting the rotor shaft;
    a partition separating the bearing cavity from the compression chamber and through which the rotor shaft extends;
    a refrigerant leakage path disposed between the pocket of high pressure refrigerant and the at least one bearing;
    a contacting seal sealingly engaged with the rotor shaft and disposed in the bearing cavity proximate the partition, the contacting seal is disposed between the at least one bearing and the refrigerant leakage path, the contacting seal defining a high seal side pressure region and a low seal side pressure region, wherein the at least one bearing is disposed on one side of the contacting seal having the low seal side pressure region, and the refrigerant leakage path is disposed on another side of the contacting seal having the high seal side pressure region; and
    a passage having an opening directly adjacent the compression chamber at the rotor shaft between the contacting seal and the compression chamber and in fluid communication with the refrigerant leakage path and the pocket of low pressure refrigerant.

2. The compressor of claim 1, wherein the contacting seal is a contacting lip seal.

3. The compressor of claim 1, wherein a portion of the passage is external to the housing.

4. The compressor of claim 3, wherein the compression chamber has an axial length, and wherein the passage discharges into the compression chamber at a location along the axial length.

5. The compressor of claim 1, wherein the passage is internal to the housing.

6. The compressor of claim 5, wherein the passage discharges in a direction substantially parallel to the axis into the pocket of low pressure refrigerant.

7. The compressor of claim 5, wherein the passage discharges into the pocket of low pressure refrigerant at an angle to the axis, wherein the angle ranges from about 10° to about 70°.

8. The compressor of claim 7, wherein the angle is about 49°.

9. The compressor of claim 5, wherein the compression chamber has an axial length, and wherein the passage discharges into the compression chamber at a location along the axial length.

10. A compressor for compressing refrigerant in a refrigerant circuit, the compressor comprising:
    a housing defining a compression chamber;
    a pair of intermeshing screw rotors mounted within the housing and configured to form a plurality of pockets, each pocket having a range of operable refrigerant pressure less than a compressor discharge pressure at a compressor discharge, one of the pair of intermeshing screw rotors having a rotor shaft rotating about an axis;
    a bearing cavity including at least one bearing rotatably supporting the rotor shaft;
    a partition separating the bearing cavity from the compression chamber and through which the rotor shaft extends, wherein a refrigerant leakage path is formed fluidly connecting the compression chamber to the bearing cavity;
    a contacting seal sealingly engaged with the rotor shaft and disposed in the bearing cavity adjacent the refrigerant leakage path, the refrigerant leakage path is disposed between the at least one bearing and at least one of the plurality of pockets,
    the contacting seal disposed between the at least one bearing and the refrigerant leakage path, the contacting seal defining a high seal side pressure region and a low seal side pressure region, wherein the at least one bearing is disposed on one side of the contacting seal having the low seal side pressure region, and the refrigerant leakage path is disposed on another side of the contacting seal having the high seal side pressure region; and
    a passage having an opening directly adjacent the refrigerant leakage path at the rotor shaft between the contacting seal and the refrigerant leakage path and in fluid communication with the refrigerant leakage path and at least one of the plurality of pockets.

11. A method of reducing the wear rate of a shaft seal, the shaft seal sealingly engaged with a rotor shaft of a screw rotor that rotates about an axis and that is mounted within a compression chamber of a rotor housing, the shaft seal disposed in a bearing cavity directly proximate a partition separating the bearing cavity from the compression chamber and through which the rotor shaft extends, the method comprising:
    operating the screw rotor to produce a pocket of high pressure refrigerant and a pocket of low pressure refrigerant within the compression chamber; and
    passing a volume of high pressure refrigerant from an area directly adjacent the compression chamber at the rotor shaft between the shaft seal and the compression chamber to the pocket of low pressure refrigerant,
    the passing a volume of high pressure refrigerant includes passing refrigerant from a refrigerant leakage path to the pocket of low pressure refrigerant, wherein the refrigerant leakage path fluidly connects the compression chamber to the bearing cavity and is disposed between at least one bearing and the pocket of high pressure refrigerant, where a contacting seal is sealingly engaged with the rotor shaft and is disposed in the bearing cavity adjacent the refrigerant leakage path,
    the passing a volume of high pressure refrigerant includes passing refrigerant over the contacting seal, wherein the contacting seal is disposed between the at least one bearing and the refrigerant leakage path, the contacting seal defining a high seal side pressure region and a low seal side pressure region, wherein the at least one bearing is disposed on one side of the contacting seal having the low seal side pressure region, and the refrigerant leakage path is disposed on another side of the contacting seal having the high seal side pressure region.

12. The method of claim 11, wherein the compression chamber has an axial length, and wherein passing a volume of high pressure refrigerant includes discharging the refrigerant at a location along the axial length.

13. The method of claim 11, wherein passing a volume of high pressure refrigerant includes passing the refrigerant to the exterior of the housing.

14. The method of claim 13, wherein the compression chamber has an axial length, and wherein passing a volume of high pressure refrigerant includes discharging the refrigerant at a location along the axial length.

15. The method of claim 11, wherein passing a volume of high pressure refrigerant includes discharging the refrigerant in a direction substantially parallel to the axis into the pocket of low pressure refrigerant.

16. The method of claim 11, wherein passing a volume of high pressure refrigerant includes discharging the refrigerant at an angle to the axis into the pocket of low pressure refrigerant.

17. The method of claim 16, wherein the angle ranges from about 10° to about 70°.

18. The method of claim 17, wherein the angle is about 49°.

19. A method of determining the optimum position of a vent to maximize the adiabatic efficiency of a compressor, the compressor including a shaft seal sealingly engaged with a rotor shaft of a screw rotor that is mounted within a compression chamber, the shaft seal disposed in a bearing cavity directly proximate a partition separating the bearing cavity from the compression chamber and through which the rotor shaft extends, a refrigerant leakage path is formed fluidly connecting the compression chamber to the bearing cavity, the shaft seal is sealingly engaged with the rotor shaft and disposed in the bearing cavity adjacent the refrigerant leakage path, the refrigerant leakage path is disposed between at least one bearing and at least one pocket of the compression chamber, the shaft seal is disposed between the at least one bearing and the refrigerant leakage path, the shaft seal defining a high seal side pressure region and a low seal side pressure region, wherein the at least one bearing is disposed on one side of the shaft seal having the low seal side pressure region, and the refrigerant leakage path is disposed on another side of the shaft seal having the high seal side pressure region, the method comprising:

locating an opening of a first vent adjacent the rotor shaft between the shaft seal and the compression chamber;
  locating a discharge of the first vent in fluid communication with a first operable pocket of low pressure refrigerant;
  operating the screw rotor to create a pocket of high pressure refrigerant and the first pocket of low pressure refrigerant;
  measuring a power consumed and an overall refrigerant flow rate produced by the compressor during operation;
  locating an opening of a substituted second vent adjacent the rotor shaft between the shaft seal and the compression chamber;
  locating a discharge of the second vent in fluid communication with a second operable pocket of low pressure refrigerant;
  operating the screw rotor to create a pocket of high pressure refrigerant and the second pocket of low pressure refrigerant;
  measuring a subsequent power consumed and a subsequent overall refrigerant flow rate produced by the compressor during operation; and
  determining the position of the vent for the compressor by evaluating compressor operation results having the first vent and compressor operation results having the substituted second vent.

20. A method of determining the optimum internal dimensions of a vent to maximize the adiabatic efficiency of a compressor, the compressor including a shaft seal sealingly engaged with a rotor shaft of a screw rotor that is mounted within a compression chamber, the shaft seal disposed in a bearing cavity directly proximate a partition separating the bearing cavity from the compression chamber and through which the rotor shaft extends, a refrigerant leakage path is formed fluidly connecting the compression chamber to the bearing cavity, the shaft seal is sealingly engaged with the rotor shaft and disposed in the bearing cavity adjacent the refrigerant leakage path, the refrigerant leakage path is disposed between at least one bearing and at least one pocket of the compression chamber, the shaft seal is disposed between the at least one bearing and the refrigerant leakage path, the shaft seal defining a high seal side pressure region and a low seal side pressure region, wherein the at least one bearing is disposed on one side of the shaft seal having the low seal side pressure region, and the refrigerant leakage path is disposed on another side of the shaft seal having the high seal side pressure region, the method comprising:

locating a first-sized vent between 1) a region adjacent the rotor shaft between the shaft seal and the compression chamber and 2) an operable pocket of low pressure refrigerant;
  operating the screw rotor to create a pocket of high pressure refrigerant and the pocket of low pressure refrigerant;
  measuring a power consumed and an overall refrigerant flow rate produced by the compressor during operation;
  locating a substituted second-sized vent between the region and the operable pocket of low pressure refrigerant;
  operating the screw rotor to create a pocket of high pressure refrigerant and the pocket of low pressure refrigerant;
  measuring a subsequent power consumed and a subsequent overall refrigerant flow rate produced by the compressor during operation; and
  determining the internal dimension of the vent for the compressor by evaluating compressor operation results having the first-sized vent and compressor operation results having the substituted second-sized vent.

* * * * *